(12) United States Patent
Shveykin et al.

(10) Patent No.: US 11,924,331 B2
(45) Date of Patent: Mar. 5, 2024

(54) MESSAGE SERVICE WITH DISTRIBUTED KEY CACHING FOR SERVER-SIDE ENCRYPTION

(71) Applicant: Amazon Technologies, Inc., Seattle, WA (US)

(72) Inventors: Petr Shveykin, North Vancouver (CA); Kelvin Yiu, Bellevue, WA (US); Jakub Wojciak, Vancouver (CA)

(73) Assignee: Amazon Technologies, Inc., Seattle, WA (US)

(*) Notice: Subject to any disclaimer, the term of this patent is extended or adjusted under 35 U.S.C. 154(b) by 197 days.

(21) Appl. No.: 17/675,670

(22) Filed: Feb. 18, 2022

(65) Prior Publication Data
US 2022/0182223 A1    Jun. 9, 2022

Related U.S. Application Data

(60) Continuation of application No. 16/554,522, filed on Aug. 28, 2019, now Pat. No. 11,258,592, which is a division of application No. 15/242,034, filed on Aug. 19, 2016, now Pat. No. 10,404,452.

(51) Int. Cl.
| | |
|---|---|
| *H04L 29/06* | (2006.01) |
| *H04L 9/08* | (2006.01) |
| *H04L 9/14* | (2006.01) |
| *H04L 9/40* | (2022.01) |

(52) U.S. Cl.
CPC ............ *H04L 9/083* (2013.01); *H04L 9/0822* (2013.01); *H04L 9/0894* (2013.01); *H04L 9/14* (2013.01); *H04L 63/0435* (2013.01); *H04L 63/064* (2013.01); *H04L 63/068* (2013.01)

(58) Field of Classification Search
None
See application file for complete search history.

(56) References Cited

U.S. PATENT DOCUMENTS

| | | | |
|---|---|---|---|
| 7,519,810 B2 | 4/2009 | Blew et al. | |
| 10,296,750 B1* | 5/2019 | Rossman | ............... G06F 21/62 |
| 11,258,592 B2 | 2/2022 | Shveykin et al. | |
| 2005/0114652 A1* | 5/2005 | Swedor | ............... H04L 63/0823 |
| | | | 713/156 |

(Continued)

FOREIGN PATENT DOCUMENTS

RU        2648956 C2 *  3/2018   ........... G06F 21/602

*Primary Examiner* — Andrew J Steinle
(74) *Attorney, Agent, or Firm* — Robert C. Kowert; Kowert, Hood, Munyon, Rankin & Goetzel, P.C.

(57) ABSTRACT

Systems and processes are described for a message service with distributed key caching for server-side encryption. Message requests are received by message handlers of the message service that cache data encryption keys used to encrypt and decrypt messages that are stored to message containers in back end storage. A metadata service obtains the data encryption keys from a key management service, caches the keys locally, and sends the keys to the message handlers upon request, where the keys are cached, again. The key management service may generate the data encryption keys based on a master key (e.g., a client's master key). The message handlers may send both message data encrypted using the data encryption key and an encrypted copy of the data encryption key to be stored together in the data store.

20 Claims, 7 Drawing Sheets

(56) References Cited

U.S. PATENT DOCUMENTS

| | | |
|---|---|---|
| 2005/0222946 A1 | 10/2005 | Mulholland et al. |
| 2005/0276415 A1 | 12/2005 | Brett et al. |
| 2006/0133614 A1 | 6/2006 | Zhang et al. |
| 2007/0038857 A1 | 2/2007 | Gosnell |
| 2008/0080713 A1 | 4/2008 | Cho et al. |
| 2010/0217987 A1 | 8/2010 | Shevade |
| 2013/0254536 A1 | 9/2013 | Glover |
| 2013/0259234 A1 | 10/2013 | Acar et al. |
| 2014/0181517 A1 | 6/2014 | Alaranta et al. |
| 2014/0380054 A1 | 12/2014 | Roth et al. |
| 2015/0089244 A1* | 3/2015 | Roth .................. H04L 63/0428 713/193 |

\* cited by examiner

MESSAGE SERVICE WITH DISTRIBUTED KEY CACHING FOR SERVER-SIDE ENCRYPTION

This application is a continuation of U.S. patent application Ser. No. 16/554,522, filed Aug. 28, 2019, which is a divisional of U.S. patent application Ser. No. 15/242,034, filed Aug. 19, 2016, now U.S. Pat. No. 10,404,452, which are hereby incorporated by reference herein in their entirety.

BACKGROUND

Secure communication channels are desirable for transmitting data between entities. Some entities find implementing and enforcing client-side encryption challenging for numerous reasons. For instance, some entities find proper key management difficult. Architectures with end-to-end encryption are difficult for customers to enforce and implement and place the difficulties of key management on the customer.

In at least some instances, such as messaging services, for example, entities desire to use a third-party messaging service, but also desire to keep the entities data protected. Some entities may opt to implement client-side encryption for such a scenario, but may find the management (e.g., management of keys) and enforcement unduly burdensome. For instance, mandated compliance requirements may be a challenge for entities to meet.

Figure 1:
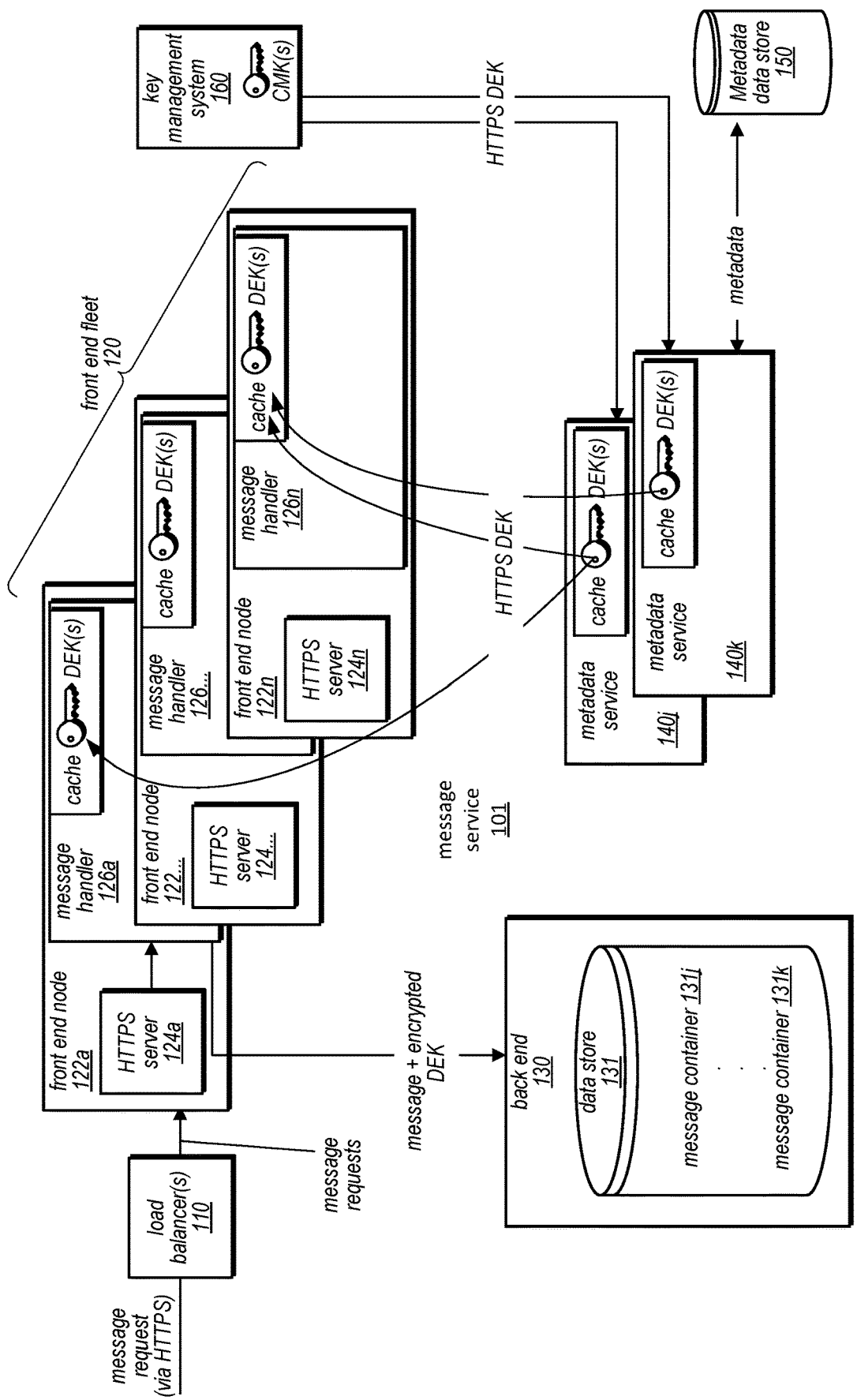
FIG. 1 depicts various data flows within a message service that implements server-side encryption with distributed key caching, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and systems that provide a message service with distributed key caching for server-side encryption are described. In embodiments, a system includes a fleet of front-end nodes for a network-based multi-user messaging system. In some instances, individual ones of the fleet of front-end nodes may include a front-end message handler that receives requests from clients to add respective messages to respective message containers. Message containers may take the form of a structure for holding messages, like a queue or other message repository, in embodiments. The system architecture may include a number of metadata services that each process metadata for a number of message handlers.

The front-end message handler may cache respective data encryption keys for respective message containers in a key cache, and encrypt message data for respective messages based on a data encryption key from the key cache. The data encryption key may correspond to the message container in which the message is to be added. In embodiments, at least some of the fleet of front-end nodes is configured to handle requests to add messages to a same one of the message containers.

The metadata service may obtain the data encryption keys from a key management service and provide the data encryption keys to individual ones of the fleet of front-end nodes, in at least some embodiments. The key management service may manage respective master keys for the users of the network-based multi-user messaging system. For instance, to obtain a respective one of the data encryption keys from the key management service for a particular one of the message containers, the metadata service may send a request to the key management service to generate the respective data encryption key based on a master key (e.g., identified via master key id) for a user associated with the particular one of the message containers.

The system architecture may include computers that provide a data store (e.g., in a backend of a system) of the network-based multi-user messaging system; the data store may include message containers that receive and store encrypted messages from the fleet of front-end nodes.

In embodiments, for a given message to be added to a message container, the one or more front-end nodes may send both message data encrypted using the respective data encryption key and the encrypted copy of the respective data encryption key to be stored together in the data store.

Figure 2:
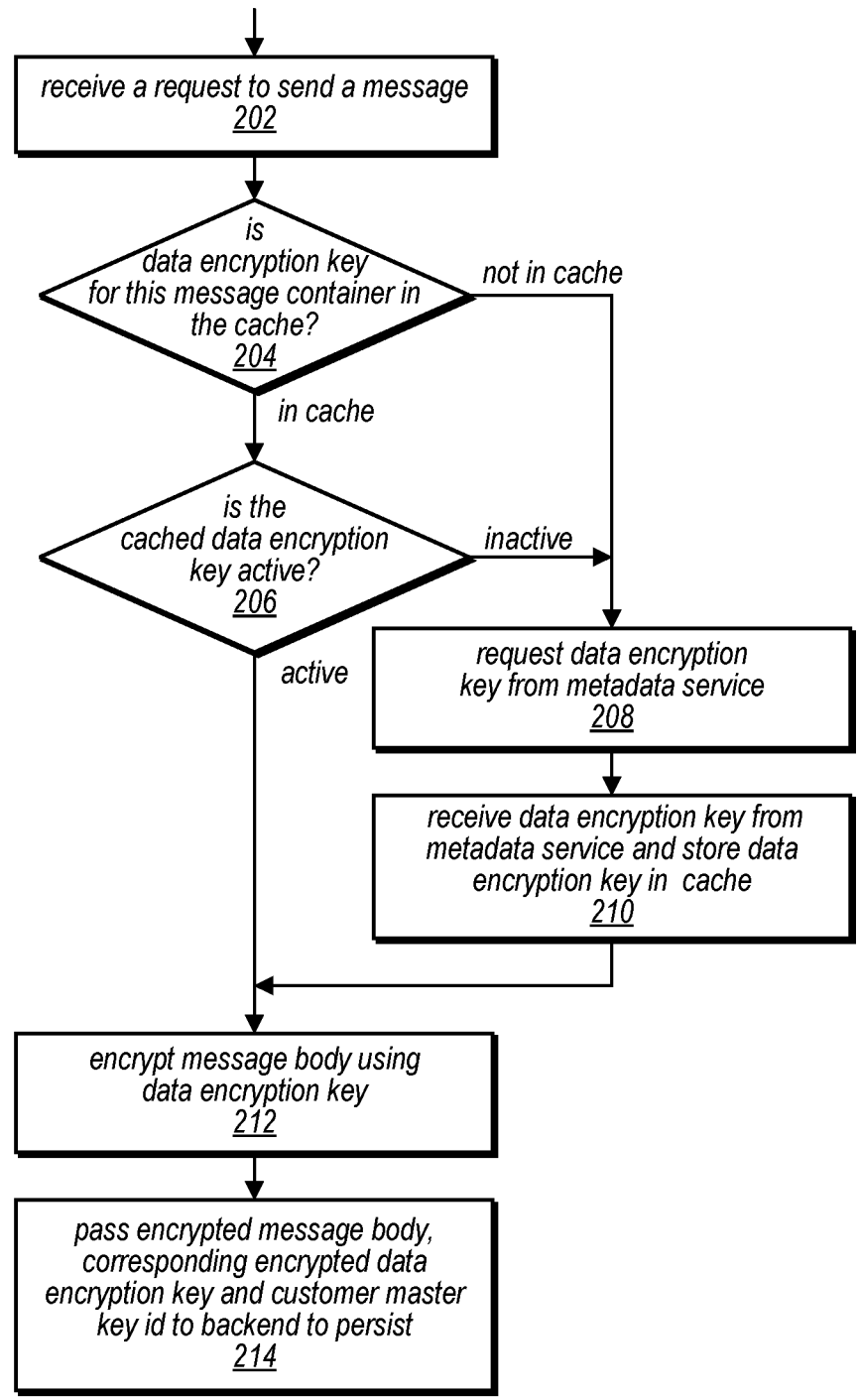
FIG. 2 depicts a process diagram illustrating the receive message functionality of a messaging service front end that implements server-side encryption with distributed key caching, according to at least some embodiments.

FIG. 1 depicts various data flows within a message service that implements server-side encryption with distributed key caching, according to at least some embodiments. FIG. 2 depicts a process diagram illustrating the receive message functionality of a messaging service front end that implements server-side encryption with distributed key caching, according to at least some embodiments. Portions of the following description describe that the process illustrated in FIG. 2 may be carried out by the various components illustrated in FIG. 1.

FIG. 1 depicts a combination of message handlers 126a-126n, metadata services 140j/k, a back end 130, metadata data store 150, and key management system 160. Generally, in at least the depicted embodiment, a metadata service 140 will initiate generation of data key(s) (sometimes referred to as data encryption keys herein) based on a master key specified by a client (CMK) and will cache the data key(s) for some period of time (e.g., hours, minutes, seconds) or M messages (or whichever happens first, in embodiments). Master keys are generally restricted to the key management system 160 and not distributed to the other components of the message service 101, in embodiments. Data encryption keys generally must either be encrypted for transport or must be transported via secure channel (e.g., HTTPS). The data keys may be passed to and cached by message handlers 126 which use the keys to encrypt/decrypt messages that are stored to a message container. The data encryption keys may be cached as a pair in embodiments, including both an encrypted key and a key in the clear. Data encryption keys may be persisted (e.g., in message containers 131j-k) with each message so the message can be later decrypted, in embodiments.

Generally, message handlers 126 cache plaintext data encryption keys for encrypting and decrypting messages and/or data encryption keys encrypted by the client's client master key to send along with the message to the message container 131 of the back end 130. In embodiments, encrypted data keys contain a reference to the client's master key used to generate it; persistence of a separate client master key id may not be necessary. In some embodiments, the amount of the message that is encrypted may be configurable. For instance, the client may wish to only encrypt the message body to the exclusion other portions of the message, such as message attributes like timestamp, senderID, etc.

A system architecture with an entity (e.g., the metadata services 140j/k) between the message handlers 126 and the key management system 160 that caches the encryption keys reduces the overall number of calls to the key management system 160 compared to systems that require each message handler 126 to call the key management system 160 directly. Additionally, generating a data encryption key per metadata service 140, instead of per message or per message handler also reduces the number of calls to the key management system 160.

Any of a number of selection techniques may be used for selection of a particular one of the metadata services for a message container. For example, consistent hashing may be used to assign a particular message container, such as a message queue (in a queue-based message service) to a particular metadata service. In embodiments, an identifier of the message container (e.g., a queue id) may be used as the object of the consistent hash.

Generally, metadata services 140 may store metadata to and obtain metadata from metadata store 150, in embodiments. The metadata may include data about the various message containers 131, metadata services 140 and the like. Generally, metadata services 140 cache data encryption keys (the cached data encryption keys may be stored in pairs, one in the clear and the other encrypted by the key management system using the client's master key). In embodiments where secure channels are not used between components, a metadata service may cache its own key encryption key that is used to encrypt data encryption keys to pass them to the message handler securely. A key encryption key may be encrypted with a system's client master key for transport, in embodiments.

In general, message services facilitate transmission of data, such as messages. Third-party message services generally strive to maximize transmission volume and throughput of data while minimizing data loss. Some message services may reduce the need for other services (e.g., the services sending the messages or the intended recipient) to always be available. It is contemplated that the service disclosed herein may be implemented in various different contexts, such as in an enterprise environment or in a cloud-based service provider environment (e.g., depicted in FIG. 5). For instance, a cloud-based message service may facilitate decoupling of components of a cloud application. One example type of message service is a queue-based message service.

Figure 3:
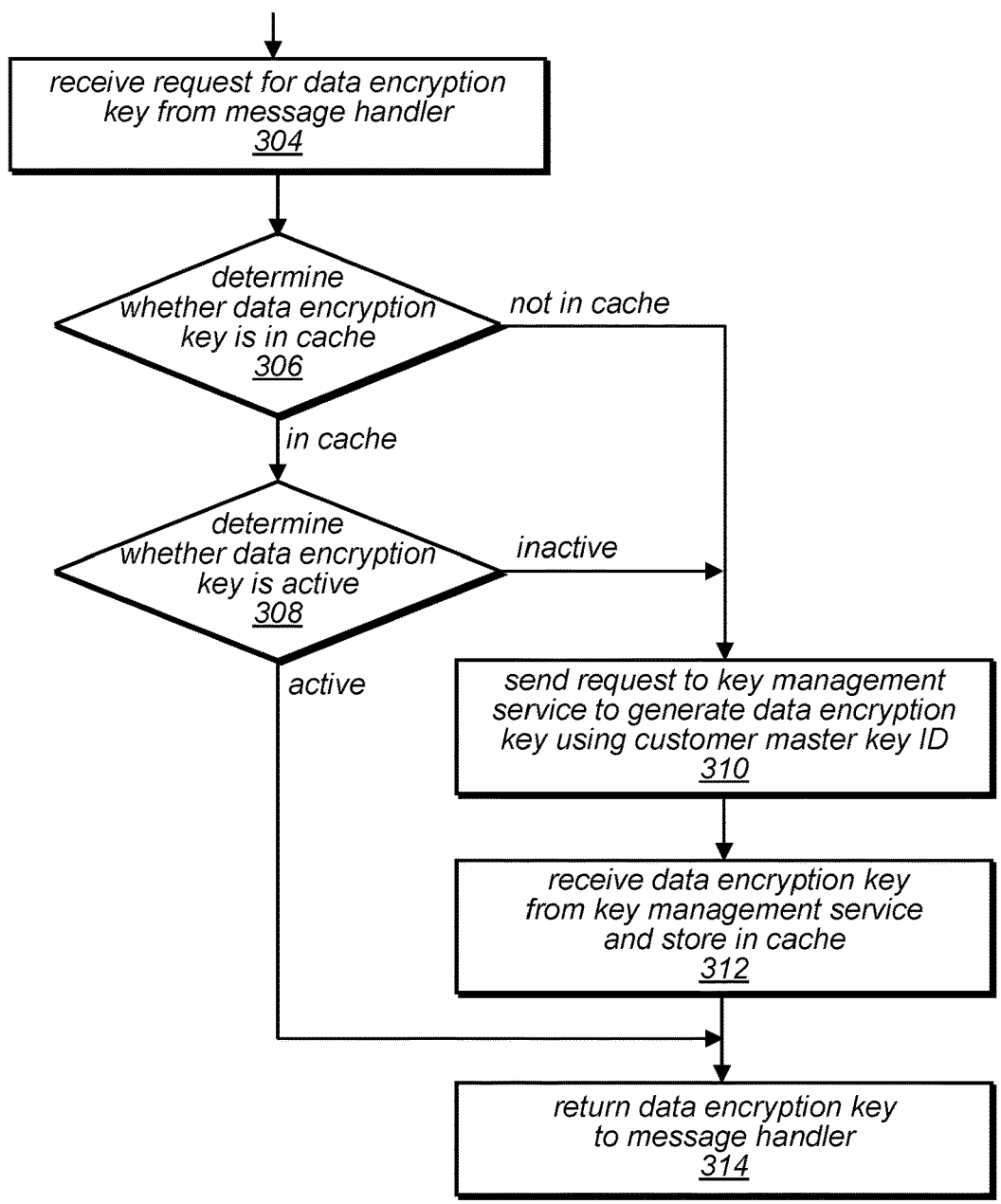
FIG. 3 depicts a process diagram illustrating the data encryption key generation and caching functionality of a messaging service metadata service that implements server-side encryption with distributed key caching, according to at least some embodiments.
Figure 4:
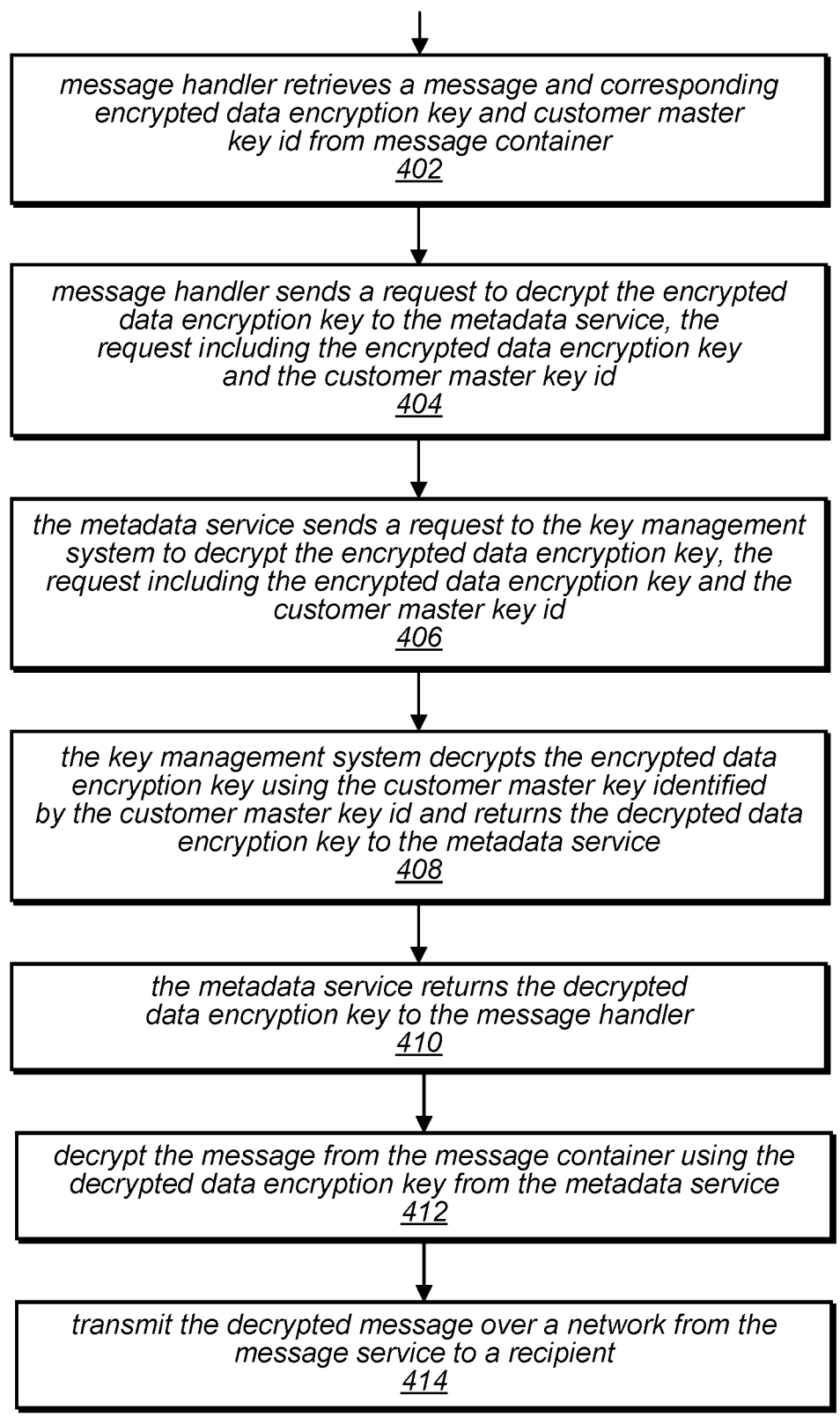
FIG. 4 illustrates a process diagram illustrating the get message functionality of a messaging service that implements server-side encryption with distributed key caching, according to at least some embodiments.

In embodiments, various components of the message service 101 may perform some or all of the functionality described herein (e.g. functionality depicted in the process diagrams of FIGS. 2-4). It is contemplated that some embodiments may include additional or fewer components than those depicted. In some embodiments various components may perform functionality to the exclusion of other components. For instance, in some embodiments, the key management system 160 may be the sole source of client master keys or may be the sole source from which the metadata services 140 request generation of a data encryption key (DEK). In some embodiments, initiation of generation of a data encryption key may be functionality that is exclusive to a metadata service 140.

Generally, it is contemplated that the depicted components may be arranged differently from the particular illustrated embodiments, that other components (not necessarily illustrated herein) may perform one or more of the steps described herein, and that at least some of the steps may be performed in a different order or not at all, without departing from the scope of the invention. Although some embodiments include processes and components within a service provider (e.g., 560) network that provides one or more services (e.g., a storage service, or a compute service) to numerous distinct clients, each client including a distinct network of one or more client devices, processes and components described herein may also be configured within an enterprise network to service messages from clients within the enterprise network, in some embodiments.

FIG. 1 depicts a message request being received at the message service 101. In some embodiments, the message may initially arrive at some system entry point such as load balancer 110 and then be routed to the message service 101. In some embodiments, the message may be received at a server (e.g., https server 124 or other network-based server) via cryptographic protocol (e.g., TSL or SSL HTTP traffic). In some embodiments, the receiving server may decrypt the message prior to providing the message to a messaging service front end component (e.g., message handler 126). Thus, the message may be "in the clear" for the handoff between the server 124 and the message handler 126. In some embodiments, this risk may be mitigated by configuring the system such that the transmission between the HTTP server 124 and the front end occurs on the same single front end node (e.g., same virtual or physical machine). It is contemplated that other solutions may be practiced to avoid or mitigate having the data in the clear between the HTTP server and the message handler without departing from the scope of this disclosure.

FIG. 1 illustrates that a message handler 126 may receive a data encryption key (DEK) from a metadata service 140. For instance, as illustrated in FIG. 2, a data encryption key may be requested from a key management system 160 in advance of a request to use the key by the message handler 126. In some embodiments, the metadata service 140 may request the data encryption key from the key management system 160 upon startup of the metadata service 140. For instance, a key may be requested when a client request or other request kicks off instantiation of the metadata service 140, irrespective of whether there is a pending message for the associated message handler, in some embodiments.

Continuing with FIG. 2, and as explained above with regard to FIG. 1, a send message request may be received (block 202). In some instances, the message request may be received by a message handler 126. As illustrated in FIG. 1 the message handler may be part of a fleet 120 of numerous message handlers. A front end node 122 may include one or more message handlers and one or more HTTPS servers 124, in embodiments. The fleet 120 may comprise a number of front end nodes 122, each node comprising a receiving server and a message handler, in embodiments.

In some embodiments, the message service 101 may include one or more metadata services 140 that handle metadata. Each metadata service 140 generally handles requests for a subset of the fleet 120 of message handlers 126, in embodiments. In some embodiments, different ones of the message handlers 126 can handle requests for the same message container 131. A particular metadata service 140 handles metadata for a particular message container 131, in embodiments.

As illustrated at block 204, the message service 101 determines whether a data encryption key for the message handler that received the send message request in block 202 is in the cache. For example, in FIG. 1, message handler 126a is illustrated receiving a message request via HTTP. The message handler 126a that received the message may determine whether a data encryption key (DEK) is in the local cache for the message handler 126a. For data encryption keys that are not in the local cache of the message handler (e.g., 126a) the message handler will request a data encryption key from a corresponding metadata service 140, as illustrated in block 208. Block 210 illustrates that the message handler (e.g., 126a) may receive the data encryption key from the metadata service (e.g., 140a) and store the data encryption key in the local cache of the message handler. In the illustrated embodiment, the key is received via a protected link (e.g., via HTTPS). In embodiments where protected link is not used, the key may be encrypted (e.g., with a key encryption key).

If the data encryption key is in the local cache, (block 204, "in cache"), the message handler may check whether the cached data encryption key is active (block 206). In some embodiments, an active key is a key that has not expired. For an expired key, the message handler will request a data encryption key from an associated metadata service 140, as illustrated in block 208. Block 210 illustrates that the message handler (e.g., 126a) may receive the data encryption key from the metadata service (e.g., 140a) and store the data encryption key in the local cache of the message handler. For an active key (block 206, active), the message handler 126 will encrypt the message body using the (e.g., plaintext) data encryption key as illustrated in block 212. Block 214 illustrates that the message handler may pass the encrypted message body, the associated encrypted data key that was used to encrypt the message body, and a client master key id to the data store (e.g., 131) to persist. For instance, the message handler 126a may pass the encrypted message to the message container 131j that corresponds to the metadata service 140j that initiated generation of the data encryption key.

FIG. 3 depicts a process diagram illustrating the data encryption key generation and caching functionality of a messaging service metadata service that implements server-side encryption with distributed key caching, according to at least some embodiments. In embodiments, FIG. 3 relates to portions of FIG. 2 in that FIG. 3 may represent additional details of functionality that is performed in between blocks 208 and 210. In embodiments, the functionality depicted may be performed by a metadata service 140.

For instance, when a front end sends a request for a data encryption key to a metadata service (e.g., block 208), the request is received by a metadata service 140 (block 304) and the metadata service determines whether the requested data encryption key is in the local cache of the metadata service (block 306). As illustrated at block 308 a determination may be made whether the data encryption key is active (e.g., has the key expired or been used more than a threshold number of times?). It is contemplated that key cache expiration may be performed either as part of requests for new data encryption keys or as part of a background process that proactively removes and renews expired keys, in embodiments. A background key cache expiration and renewal process may run on each of the message handlers 126 and each of the metadata services 140, for example.

In either case (the key is not in the cache or the key has expired) the metadata service 140 may send a request to the key management service 160 to generate a data encryption key using the client master key id (block 310). The metadata service 140 may then receive the data encryption key back (e.g., via HTTPS) from the key management service 160 and store the key in the cache that is local to the metadata service 140 (block 312). Block 314 indicates that the data encryption key is then returned (e.g., via HTTPS) to the message handler 126, that encrypts the message body and sends the encrypted message body for storage at the data store (e.g., via HTTP). In some embodiments (e.g., when an additional layer of encryption is used in place of HTTPS connections between the components of the message service 101, not illustrated) a data encryption key DEK is encrypted with a key encryption key for transmission.

Whereas FIG. 2 illustrates send message functionality, FIG. 4 illustrates a process diagram illustrating the get message functionality of a messaging service that implements server-side encryption with distributed key caching, according to at least some embodiments. In embodiments, some or all of the data transmission may be performed via secure channels such as HTTPS. In some embodiments, an additional layer of encryption may be used as an alternative means of security.

FIG. 4 illustrates that a front end retrieves a message and an associated encrypted data encryption key and a client master id from a message container (block 402). For instance, the message may be the next message to be sent in a queue of messages in a queue-based message service. In the illustrated embodiment, the message handler 126 sends a request to decrypt the encrypted data encryption key to the metadata service, the request including the encrypted data encryption key (and the client master key id, in embodiments) (block 404). The metadata service 140 sends a request to the key management system 160 to decrypt the encrypted data encryption key, the request including the encrypted data encryption key and the client master key id (block 406). In some embodiments, the decryption key may be in one of the caches (e.g., either the message handler's cache or the respective metadata service cache). The key management system 160 decrypts the encrypted data encryption key using the client master key identified by the client master key id and returns the decrypted data encryption key to the metadata service 140 (block 408). The metadata service 140 returns the decrypted data encryption key to the message handler (block 410). The message from the message container is decrypted using the decrypted data encryption key from the metadata service (block 412). The decrypted message is transmitted over a network from the message service to a recipient (block 414). For instance, the message may be sent over a provider network from message service 101 to client 510 or client 540a or to other services 550.

Figure 5:
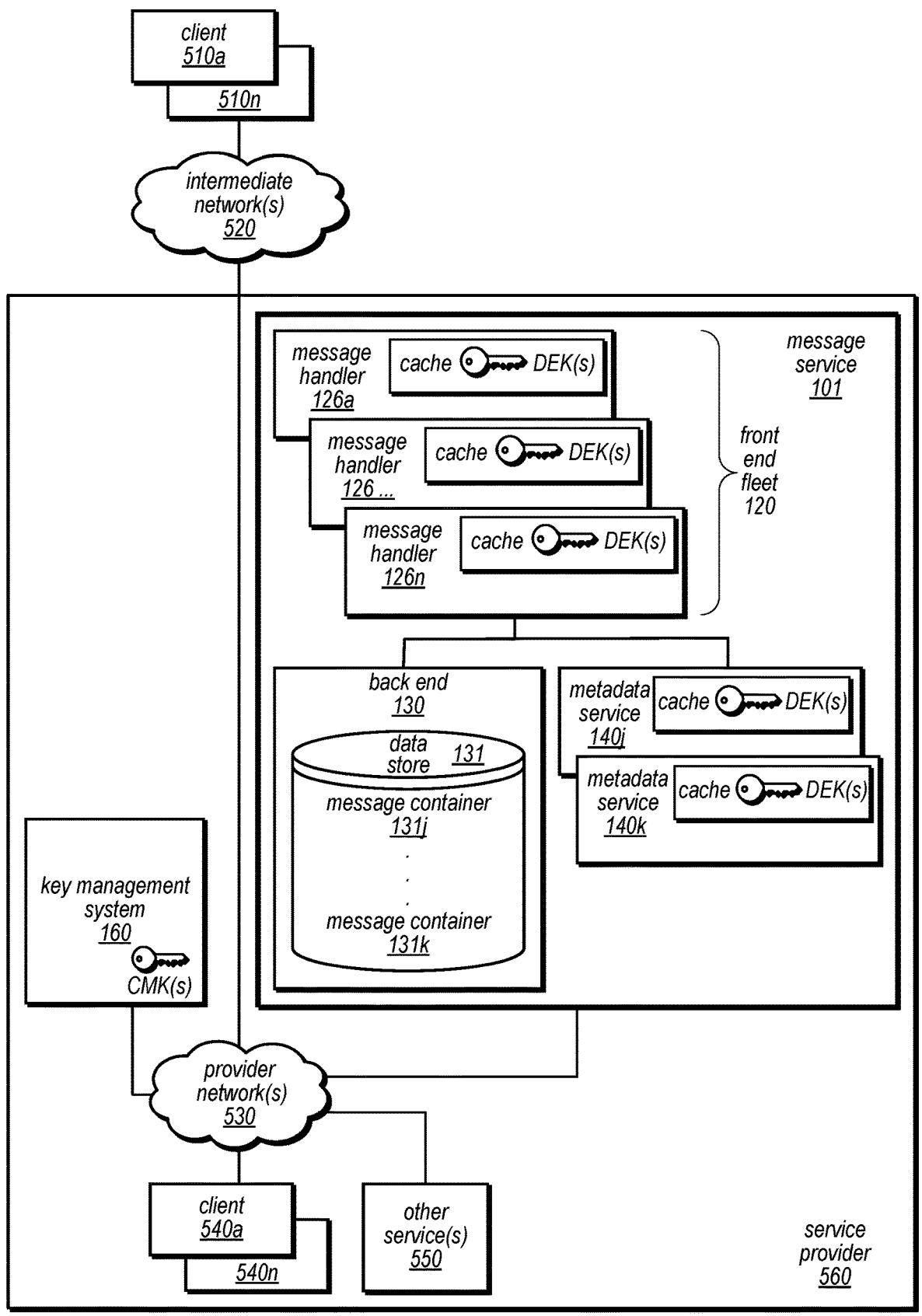
FIG. 5 illustrates a message service as describe herein within the context of a cloud-based service provider, according to at least some embodiments.

FIG. 5 illustrates a message service as describe herein within the context of a cloud-based service provider, according to at least some embodiments. Although the disclosed message service 101 is depicted as part of a cloud-based service provider system 560, it is contemplated that the message service 101 may be implemented in other contexts, such as within an enterprise, as a stand-alone messaging system, or other otherwise.

In the illustrated embodiment, the system architecture supports external clients 510 that access the service provider components via intermediate networks 520, as well as clients 540 that are internal to the service provider. In embodiments, the internal clients may execute on behalf of customers of the service provider 560.

Other services 550 of the service provider 560 are depicted. The other services 550 may execute on behalf of clients or may represent additional service provided by the service provider. In some instances, the other services 550, clients 510 and clients 540 may rely upon the message service 101 to deliver messages. In some embodiments, the message service 101 may receive messages from and deliver messages to the other services 550 or clients 510, 540 (e.g., via provider network(s) 530). In the illustrated embodiment, the key management system 160 is depicted as a service provider system that is external to the message service. In embodiments, the key management system 160 may be external to the service provider (provided by a client on a customer system, for example).

In embodiments, implementations with a key management system 160 provide a balance between customer visibility (e.g., key management by the message service instead of a key management system may hide much of the functionality from customers, like a black box, in embodiments) and participation in key management. For instance, in embodiments, a key management system 160 may be configured to allow clients to see (e.g., via various logs create by the key management system 160) key usage or rotate master keys themselves (e.g., see FIG. 6A). However, architectures with a key management system may introduce lag times and an extra point of failure over architectures without a key management system.

Queue-Based Messaging Service

In embodiments, a queue-based message service may be provided by a service provider. For instance, the message service 101 may be a queue-based messaging service that handles messages or workflows between other components in a system. As illustrated in FIG. 5, the other components may be within or outside of the service provider providing the queue service. The service may be accessed via an application program interfaces (API) (e.g., via an API with SendMessage, ReceiveMessage, and DeleteMessage calls). A service provided by a service provider (e.g., a cloud-based service provider) may have the characteristics of high availability, practically unlimited scalability, and built-in security (e.g., authentication mechanisms).

In an example embodiment of a queue-based message service, the message containers 131 are queues that store messages. The metadata services 140 are queue metadata services that store metadata for the queues. Every queue metadata service instance handles requests for a subset of queues, in embodiments. The queue metadata services store metadata to a data store 150, as illustrated in FIG. 1.

In embodiments, a front-end message handler 126 calls a queue metadata service instance to get queue metadata (e.g., which key to use for encryption, etc.). Generally, each instance of a queue metadata service obtains a data encryption key from a key management system 160 and caches the key local to the queue metadata service. Plaintext data encryption keys and data encryption keys encrypted with a customer's customer master key (CMK) may be obtained, in embodiments. A queue metadata service responds to requests from the message handlers for a data key by providing the locally cached key(s) of the queue metadata service to the message handler. The requesting message handler may also cache the key(s) in a cache local to the message handler. For instance, plaintext data encryption keys may be cached by the message handler to use to encrypt and decrypt messages. Data encryption keys encrypted with the customers CMK may also be cached by the message handler and passed to the message store along with the message (e.g., such that the key used to encrypt the message is available after a key rotation period has passed). A system architecture that makes use of such key caches may reduce the number of calls to the key management system 160. A system architecture that provides a queue metadata service for a subset of queues (a one-to-many relationship) also reduces the number of calls to the key management system.

Figure 6A:
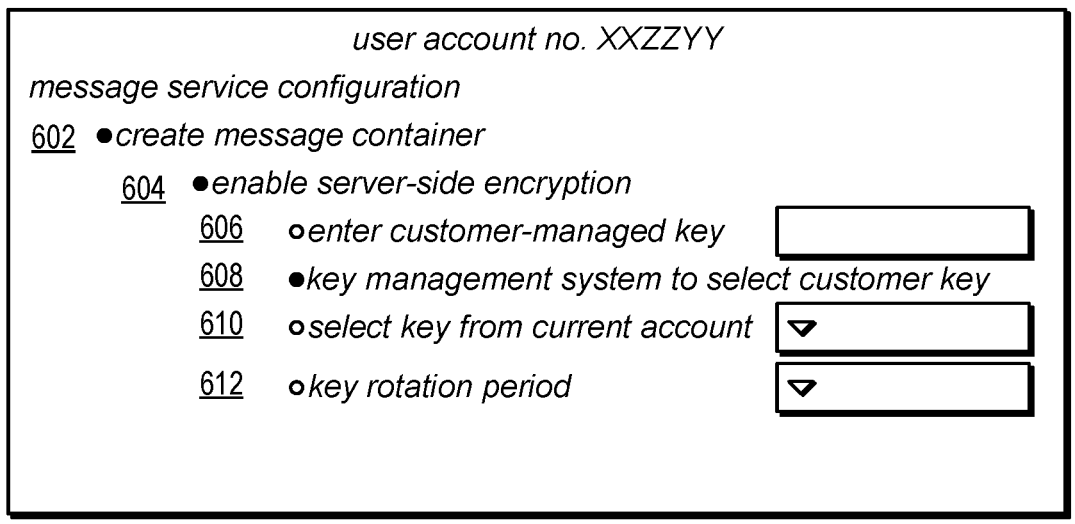
FIG. 6A illustrates a user interface with user interface elements for configuring a message service as describe herein, according to at least some embodiments.

FIG. 6A illustrates a user interface with user interface elements for configuring a message service as describe herein, according to at least some embodiments. Message service 101 may be accessed any of numerous ways. For instance, the message service 101 may provide an API or graphic user interface for accessing various functionality of the message service 101.

In one example, a client may create a new message container (e.g., a new message queue created via an API) using either a default service client management key or a client-managed key. Item 602 of FIG. 6a illustrates a user interface version where a client may select (e.g., via radio button selectors, drop down menus and text entry interface elements, etc.) configurable options such as creating a message container (602, selected) with server-side encryption (604, selected). Embodiments may provide for a client master key (606) by region and/or by account and/or for a key management system 160 to select the client key (608, selected). In some embodiments, the key may be selected from existing keys of a current account (610). A key rotation period may be configurable (e.g., period of time and/or number of messages), in embodiments. All messages sent to this new message container will be encrypted, in embodiments. It is contemplated that distinct types of keys may have different caches and may be associated with different key rotation periods. For instance, decryption keys and encryption keys may be stored separately and may have distinct rotation or reuse periods. The periods may be configurable, in embodiments. In some embodiments, the rotation periods or configuration thereof may not be exposed (e.g., to customers).

In another example, a client may use an API to update an existing queue to enable server-side encryption or to disable server-side encryption. Additionally, a client may update the client master key (CMK) to be used for server-side encryption for a message container. In embodiments, the old CMK will still need to be stored for use to decrypt previously-sent messages (e.g., for up to some threshold number of days), in embodiments. In yet other embodiments, the API may provide functionality for a client to revoke access to a client master key assigned to a message container (e.g., for a particular principal or requestor).

Figure 6B:
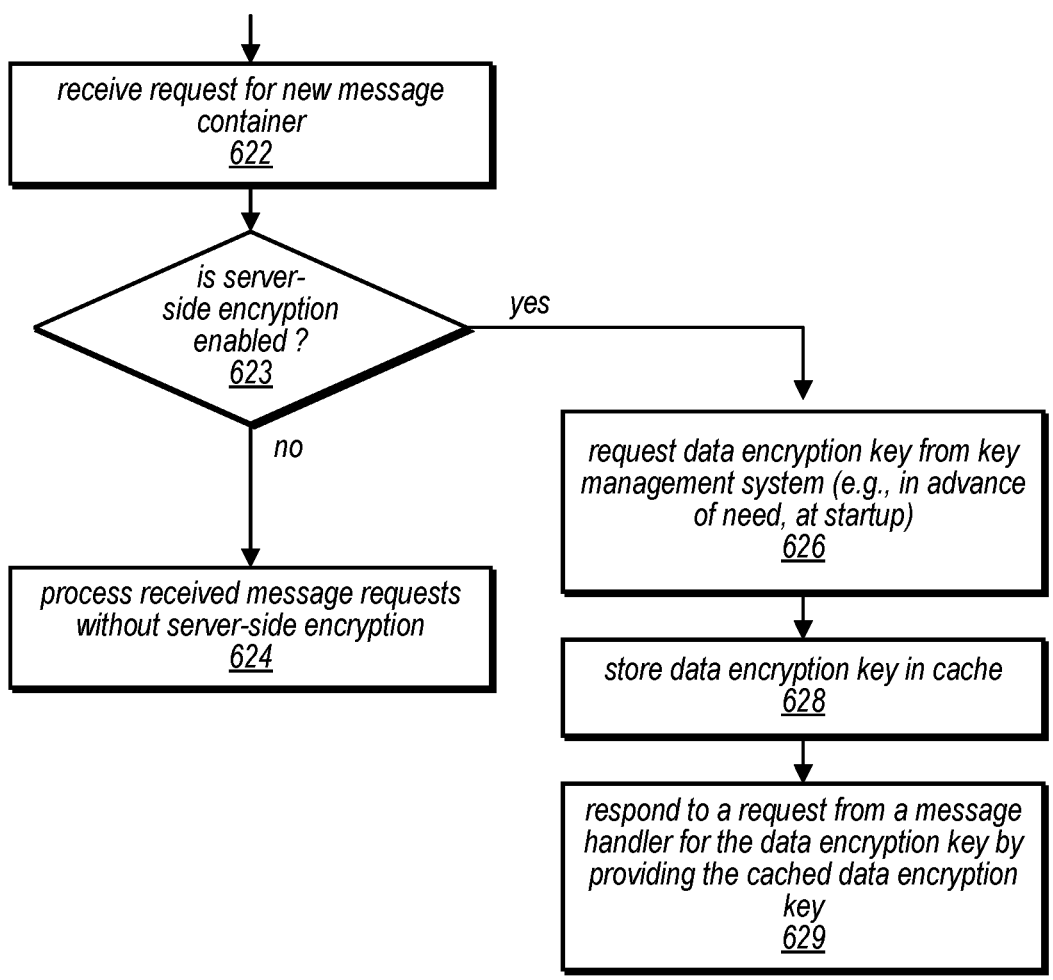
FIG. 6B illustrates a process diagram depicting creation of a new message container in a message service that implements server-side encryption with distributed key caching.

FIG. 6B illustrates a process diagram depicting creation of a new message container in a message service that implements server-side encryption with distributed key caching. Various steps of the illustrated process may be performed by various components of the system depicted in FIGS. 1, 5, and 7 for example. In the depicted embodiment, the message service receives a request for a new message container (block 622). The system determines whether server-side encryption is enabled for the container (block 623). For instance, the request for the new container may have specified server-side encryption or metadata associated with the container may indicate server-side encryption or not. Block 624 illustrates that if server-side encryption is not enabled, the received message requests are processed without server-side encryption. Block 626 illustrates that if server-side encryption is enabled, a data encryption key is requested from the key management system. For instance, the key may be requested at startup or instantiation of the message container. The obtained key may be stored in a cache local to or associated with the metadata service 140. At block 629, the system responds to a request from a message handler for the data encryption key by providing the cached data encryption key that was obtained from the key management system.

It is contemplated that the system may be configured such that the client can require and enforce permissions that control whether account users making requests to a message container have an associated permission to use the master key assigned to the message container (e.g., encrypt permissions for send message calls and decrypt permission for receive message calls). In some instances, such functionality may be built into or take advantage of existing authentication/authorization functionality, such as the underlying authentication/authorization functionality of the messaging service. For instance, the front end node 122 may perform authentication/authorization for received messages prior to passing the plaintext request to the data store to persist. In some instances, the system may be configured to support an administrator's configuration of user accounts to request server-side encryption or to receive encrypted messages via the messing system, for example.

Some embodiments may provide for the client to choose the encryption algorithm.

In some embodiments, the system may be configured with a grace period (e.g., a time period between initiation of generation of the new data key and the time that use of the previous key for encryption of new messages ends). For instance, such a mechanism could facilitate continued processing of messages in the event of a failure, throttling, or outage of the key management system 160. In some embodiments, the system may be configured to send a digital message (e.g., a status, warning or error message) to a principal indicating the continued use of the otherwise-expired key.

Figure 7:
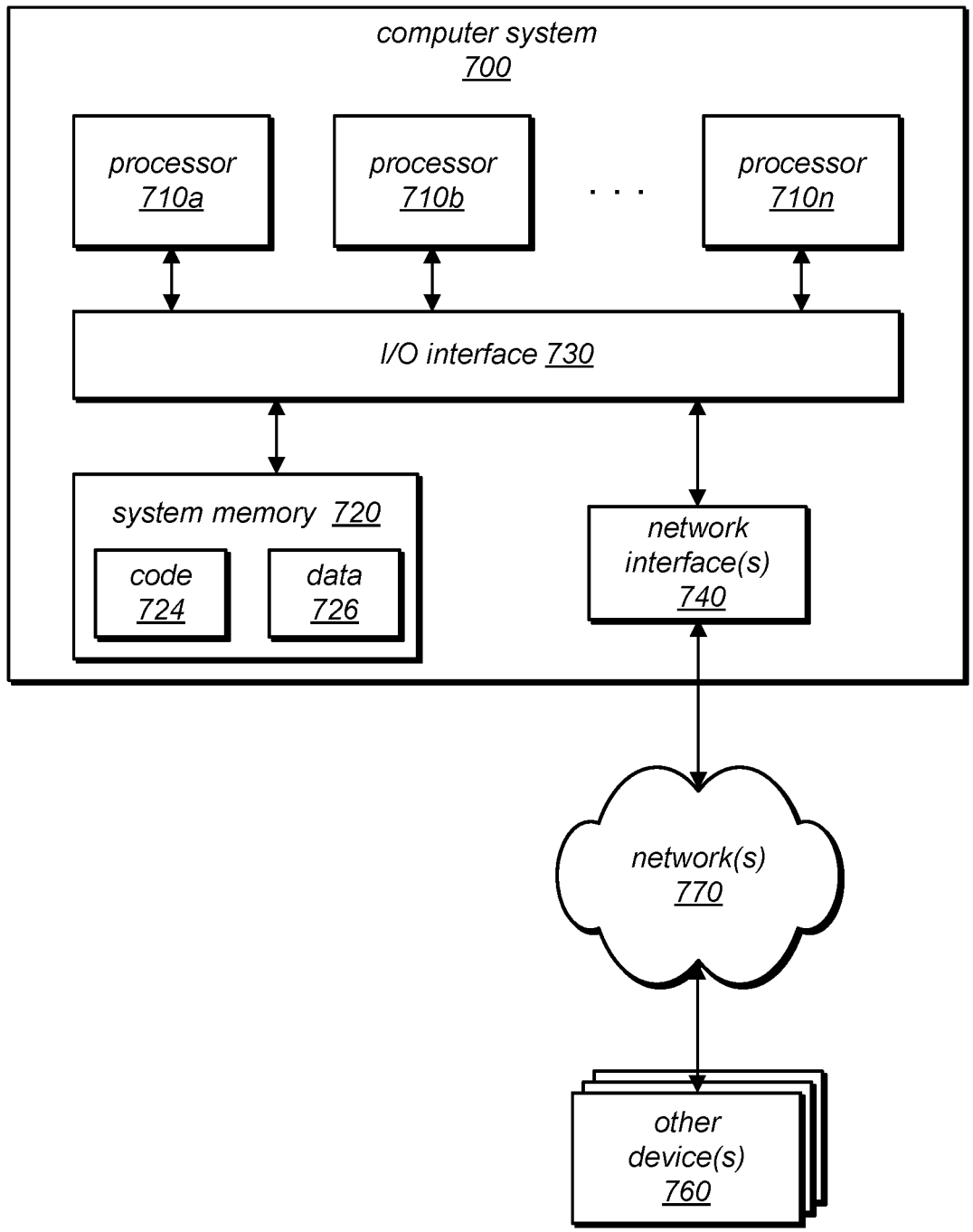
FIG. 7 is a block diagram illustrating an example computer system that may be used in some embodiments.

FIG. 7 is a block diagram illustrating an example computer system that may be used in some embodiments of a message service that implements server-side encryption with distributed key caching.

Illustrative System

FIG. 7 is a block diagram illustrating an example computer system that may be used in some embodiments. In at least some embodiments, one or more servers that implement a portion or all of the message service that implements server-side encryption with distributed key caching as described herein may include a computer system that includes or is configured to access one or more components of a system such as message service 101, client 540, other service(s) 550 or key management system 160 illustrated in FIG. 5, for example. In the illustrated embodiment, computer system 700 includes one or more processors 710 coupled to a system memory 720 via an input/output (I/O) interface 730. Computer system 700 further includes a network interface 740 coupled to I/O interface 730.

In various embodiments, computer system 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store instructions and data accessible by processor(s) 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for authenticating session establishment messages and generating key pair, based on pre-shared-secret methods, are shown stored within system memory 720 as code 724 and data 726.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices 760 attached to a network or networks 750, such as other computer systems or devices as illustrated in FIGS. 1 and 5, for example. In various embodiments, network interface 740 may support communication via any suitable wired or wireless general data networks, such as types of Ethernet network, for example. Additionally, network interface 740 may support communication via telecommunications/telephony networks such as analog voice networks or digital fiber communications networks, via storage area networks such as Fibre Channel SANs, or via any other suitable type of network and/or protocol.

In some embodiments, system memory 720 may be one embodiment of a computer-accessible medium configured to store program instructions and data as described above for FIGS. 1 through 6 for implementing embodiments of a message service that implements server-side encryption with distributed key caching. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 700 via I/O interface 730. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software (e.g., computer-readable program instructions), hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

The invention claimed is:

1. A system, comprising:
one or more computers configured to:
provide an interface for enabling or disabling, by a customer and via the interface, server-side encryption for processing messages of message requests directed to a customer message container;
receive, via the interface, an indication whether server-side encryption is enabled or disabled for the customer message container;
receive requests from one or more client devices to process messages directed to the customer message container;
if server-side encryption has been enabled, via the interface and for the customer message container, process the messages with server-side encryption; and
if server-side encryption has been disabled, via the interface and for the customer message container, process the messages without server-side encryption.

2. The system of claim 1, wherein the one or more computers are further configured to implement a queue-based message service comprising a plurality of message queues, wherein the customer message container is one of the plurality of message queues, wherein the provided interface is for enabling or disabling server-side encryption for processing messages of message requests directed to one or more of the message queues of the queue-based message service.

3. The system of claim 1, wherein the one or more computers are configured to:
responsive to server-side encryption having been enabled, via the interface and for the customer message container,
perform said process the messages with server-side encryption comprising:
request, at instantiation or startup of the customer message container, a data encryption key for the customer message container;
cache the data encryption key; and
perform said process the messages with server-side encryption based at least in part on the cached data encryption key.

4. The system of claim 3, further comprising:
a network-based multi-user messaging system implemented at least in part by the one or more computers and configured to perform said provide the interface, said receive the indication, said receive requests and said process the messages;
wherein to perform said request the data encryption key the network-based multi-user messaging system is configured to request the data encryption key from a key management service that manages respective master keys for users of the network-based multi-user messaging system; and
wherein the cached data encryption key is the data encryption key obtained from the key management service.

5. The system of claim 4, wherein to request the data encryption key from the key management service for the customer message container, the one or more computers are configured to send a request to the key management service to generate the data encryption key based on a master key for a user associated with the customer message container.

6. The system of claim 1, wherein said an interface for enabling or disabling server-side encryption comprises one or more graphical user interface elements or an application program interface configured to:
specify a customer-managed key for the server-side encryption;
specify a key management system-based selection of a key for the server-side encryption;
specify a key from a current account for the server-side encryption; or
specify a key rotation period.

7. The system of claim 1, wherein:
the one or more computers implement a message service of a service provider that provides services to a plurality of distinct clients; and the one or more computers comprise:
one or more computers configured to implement a message service configuration component configured to perform said provide and said receive the indication; and
a plurality of computers configured to implement front-end nodes for the message service, the front-end nodes configured to perform said receive requests and perform said process the messages.

8. A method, comprising:
providing, by a message service of a service provider that provides services to a plurality of distinct customers, an interface for enabling or disabling server-side encryption for processing messages of message requests directed to customer message containers;
receiving, via the interface, an indication that server-side encryption is enabled for a first message container;
processing, responsive to receipt of a request to process first one or more messages directed to the first message container for which server-side encryption is enabled, the first one or more messages with server-side encryption;
receiving, via the interface, an indication that server-side encryption is disabled for a second message container; and
processing, responsive to receipt of a request to process second one or more messages directed to the second message container for which server-side encryption is disabled, the second one or more messages without server-side encryption.

9. The method of claim 8,
further comprising, prior to said processing the first one or more messages with server-side encryption:
requesting a data encryption key for the first message container; and
caching the data encryption key; and
wherein said processing the first one or more messages with server-side encryption comprises processing the first one or more messages with server-side encryption based at least in part on the cached data encryption key.

10. The method of claim 9, wherein:
the message service comprises a network-based multi-user messaging system of the service provider;
said providing the interface, said receiving the indications, said receiving the requests and said processing the messages are performed by the network-based multi-user messaging system;
said requesting the data encryption key comprises requesting the data encryption key from a key management service that manages respective master keys for users of the network-based multi-user messaging system; and
said caching the data encryption key comprises caching the data encryption key obtained from the key management service.

11. The method of claim 10, wherein said requesting the data encryption key from a key management service comprises sending a request to the key management service to generate the data encryption key based on a master key for a user associated with the first message container.

12. The method of claim 8, further comprising:
receiving, from the interface:
specification of a customer-managed key for performing the server-side encryption;
specification of a key management system-based selection of a key for performing the server-side encryption;
specification of a key from a current account for performing the server-side encryption; or
specification of a key rotation period for performing the server-side encryption; and
wherein said processing the first one or more messages with server-side encryption comprises processing the first one or more messages in accordance with the specification received from the interface.

13. The method of claim 8, wherein:
said processing the first one or more messages with server-side encryption comprises encrypting the first one or more messages in accordance with the server-side encryption; and
the method further comprises transmitting the encrypted first one or more messages to the first message container for which server-side encryption is enabled.

14. The method of claim 13, wherein said transmitting the encrypted first one or more messages to the first message container comprises transmitting the corresponding data encryption key to the first message container for which server-side encryption is enabled.

15. One or more non-transitory computer-readable media storing program instructions executable on or across one or more processors to:
provide an interface for enabling or disabling server-side encryption for processing message requests directed to a customer message container; and
receive, via the interface, an indication whether server-side encryption is enabled or disabled for the customer message container;
receive requests from one or more client devices to process messages directed to the customer message container;
if server-side encryption has been enabled, via the interface and for the customer message container, process the messages with server-side encryption; and
if server-side encryption has been disabled, via the interface and for the customer message container, process the messages without server-side encryption.

16. The one or more non-transitory computer-readable media of claim 15, wherein to process the messages with server-side encryption, the program instructions are executable to:
request a data encryption key for the customer message container;
cache the data encryption key; and
process the messages with server-side encryption based at least in part on the cached data encryption key.

17. The one or more non-transitory computer-readable media of claim 16, wherein:
to request the data encryption key, the program instructions are executable to request the data encryption key from a key management service that manages master keys for a plurality of users; and
the cached data encryption key is the data encryption key obtained from the key management service.

18. The one or more non-transitory computer-readable media of claim 17, wherein to request the data encryption key from the key management service for the customer message container, the program instructions are executable to send a request to the key management service to generate the data encryption key based on a master key for a user associated with the customer message container.

19. The one or more non-transitory computer-readable media of claim 15, wherein:

to provide the interface, the program instructions are executable to provide one or more graphical user interface elements or an application program interface configured to:
  specify a customer-managed key for the server-side encryption;
  specify a key management system-based selection of a key for the server-side encryption;
  specify a key from a current account for the server-side encryption; or
  specify a key rotation period; and
to process the one or more messages with server-side encryption the program instructions are executable to process the one or more messages with server-side encryption in accordance with the specification received via the interface.

20. The one or more non-transitory computer-readable media of claim 15, wherein to process the one or more messages with server-side encryption the program instructions are executable to:
  encrypt the one or more messages in accordance with the server-side encryption; and
  transmit the encrypted one or more messages to the customer message container.

* * * * *